(12) United States Patent
Tsai (10) Patent No.: US 7,683,663 B1
(45) Date of Patent: Mar. 23, 2010

(54) AUTHORIZATION OF AN IMPLEMENTATION OF A USER DESIGN IN A PROGRAMMABLE INTEGRATED CIRCUIT

(75) Inventor: Chih-Ming Tsai, Taipei (TW)

(73) Assignee: XILINX, Inc., San Jose, CA (US)

( * ) Notice: Subject to any disclaimer, the term of this patent is extended or adjusted under 35 U.S.C. 154(b) by 0 days.

(21) Appl. No.: 12/353,234

(22) Filed: Jan. 13, 2009

(51) Int. Cl.
*H03K 19/173* (2006.01)
(52) U.S. Cl. .......................................... 326/38; 326/8
(58) Field of Classification Search .............. 326/8, 326/9, 37–41
See application file for complete search history.

(56) References Cited

U.S. PATENT DOCUMENTS

| 7,162,644 | B1 * | 1/2007 | Trimberger | 713/189 |
| 7,518,396 | B1 * | 4/2009 | Kondapalli et al. | 326/38 |
| 7,576,561 | B1 * | 8/2009 | Huang | 326/38 |
| 2003/0122578 | A1 * | 7/2003 | Masui et al. | 326/39 |
| 2008/0125043 | A1 * | 5/2008 | Karmanenko et al. | 455/41.2 |

OTHER PUBLICATIONS

Smerdon, Maureen, White Paper: Spartan-3A, Spartan-3A DSP, and Spartan-3AN FPGA Families, "Security Solutions Using Spartan-3 Generation FPGAs", WP266 (v1.0) Jul. 24, 2007, pp. 1-12, Xilinx, Inc., 2100 Logic Drive, San Jose, CA.

Crow, Glenn, White Paper: Spartan-3A/3AN/3A DSP, "Advanced Security Schemes for Spartan-3A/3AN/3A DSP FPGAs", WP267 (v1.0) Aug. 15, 2007, pp. 1-11, Xilinx, Inc., 2100 Logic Drive, San Jose, CA.

* cited by examiner

*Primary Examiner*—Don P Le
(74) *Attorney, Agent, or Firm*—LeRoy D. Maunu (57) ABSTRACT

A system implements and authorizes use of a user design. A non-volatile memory stores combined configuration data including first configuration data for implementing a user design and an authorization module, and second configuration data for implementing a generator of a check code. In response to a reset, a programmable integrated circuit loads the first configuration data to implement the user design and the authorization module. The implemented authorization module generates an activation code from an identifier when the check code is available from the non-volatile memory and enables the user design when the check and activation codes match. The programmable integrated circuit loads the second configuration data to implement the generator when the check code is not available from the non-volatile memory. The implemented generator erases the second configuration data from the non-volatile memory, generates the check code from the identifier, and stores the check code in the non-volatile memory.

20 Claims, 4 Drawing Sheets

AUTHORIZATION OF AN IMPLEMENTATION OF A USER DESIGN IN A PROGRAMMABLE INTEGRATED CIRCUIT

FIELD OF THE INVENTION

The present invention generally relates to programmable integrated circuits, and more particularly to authorized usage of a programmable integrated circuit.

BACKGROUND

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

The developer of a user design often wants to limit usage of the user design to authorized use. However, an unauthorized user can read the configuration data for implementing a user design from an existing implementation of the user design. The unauthorized user can then use this configuration data to implement the user design in additional PLDs. Any unauthorized use impacts the investment return for the time consuming and difficult development of a user design.

The present invention may address one or more of the above issues.

SUMMARY

Various embodiments of the invention provide a system for implementing a user design and enabling authorized use of the user design. The system includes a non-volatile memory and a programmable integrated circuit. The non-volatile memory stores a combined configuration data set that includes a first configuration data set for implementing a user design and an authorization module, and a second configuration data set for implementing a generator of a check code. The programmable integrated circuit is coupled to the non-volatile memory. The programmable integrated circuit loads the first configuration data set from the non-volatile memory in response to a reset of the programmable integrated circuit. The programmable integrated circuit implements the user design and the authorization module in response to the loading of the first configuration data set. The implemented authorization module generates an activation code from an identifier in response to the check code being available from the non-volatile memory and enables the user design in response to the check code being available and matching the activation code. The programmable integrated circuit loads the second configuration data set from the non-volatile memory and implements the generator in response to the check code not being available from the non-volatile memory. The implemented generator erases the second configuration data set from the non-volatile memory, generates the check code from the identifier, and stores the check code in the non-volatile memory.

Various other embodiments of the invention provide a method to authorize an implementation of a user design in one or more programmable integrated circuits. A first configuration data set is generated for implementing the user design and an authorization module in a programmable integrated circuit. A second configuration data set is generated for implementing an erasure module and a generator of a check code in a programmable integrated circuit. The first and second configuration data sets are combined into a combined configuration data set. The combined configuration data set is stored in a respective non-volatile memory for each programmable integrated circuit. The erasure module and the generator are implemented in each programmable integrated circuit using the combined configuration data set from the respective non-volatile memory in response to the check code not being available from the respective non-volatile memory. The erasure module erases the second configuration data set from the combined configuration data set stored in the respective non-volatile memory. The generator generates the check code from an identifier of the programmable integrated circuit and stores the check code in the respective non-volatile memory. The user design and the authorization module are implemented in each programmable integrated circuit using the combined configuration data set from the respective non-volatile memory. The authorization module generates an activation code from the identifier of the programmable integrated circuit in response to the check code being available from the respective non-volatile memory and enables the user design in response the check code being available and matching the activation code.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION OF THE DRAWINGS

Figure 1:
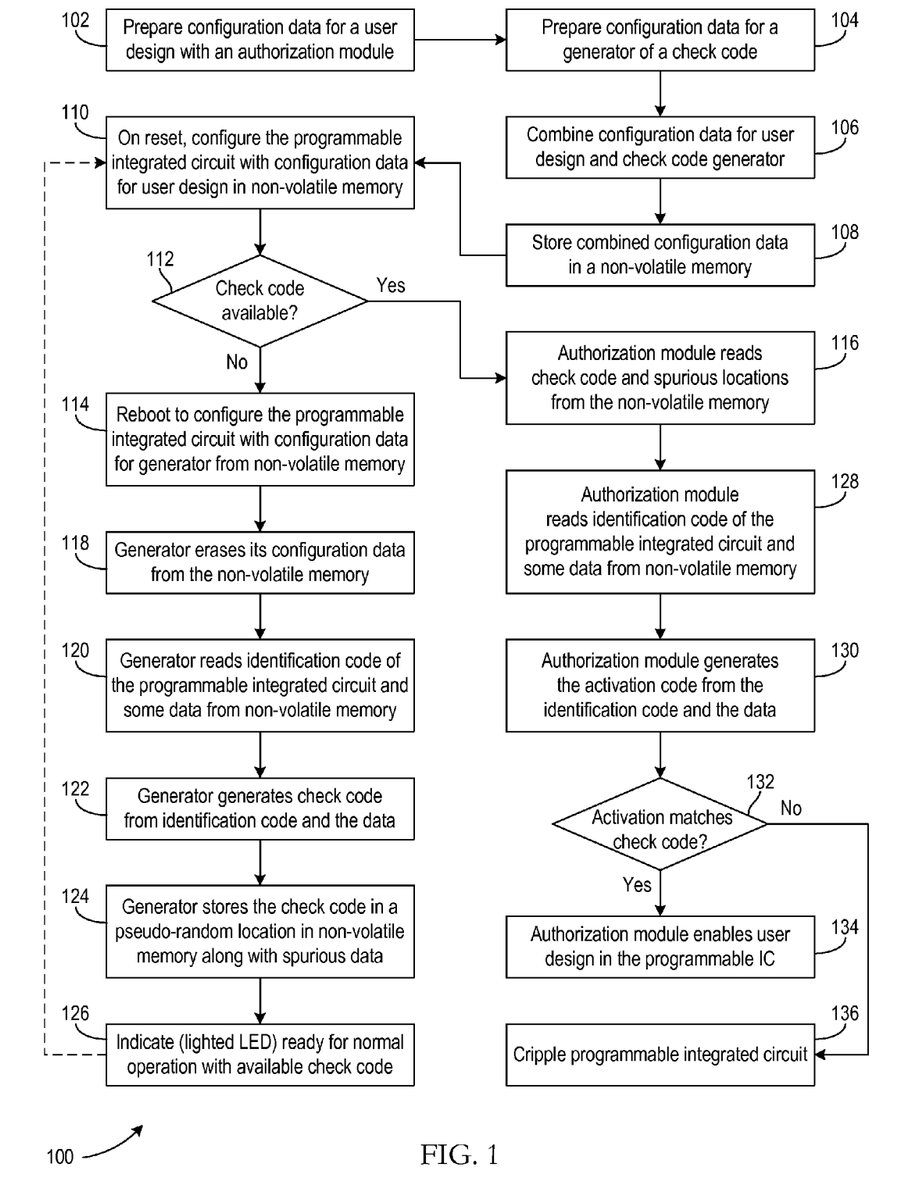
FIG. 1 is a flow diagram of a process to authorize an implementation of a user design in one or more programmable integrated circuits in accordance with various embodiments of the invention.

FIG. 1 is a flow diagram of a process 100 to authorize an implementation of a user design in one or more programmable integrated circuits in accordance with various embodiments of the invention. In one embodiment, a manufacturer uses process 100 to manufacture a system that implements a user design in a programmable integrated circuit, while preventing unauthorized use of the user design from copied configuration data.

At step 102, a set of configuration data is prepared for a user design and an authorization module. For example, the user design and the authorization module may be specified in a description in a hardware description language, such as Verilog or VHDL, and the description is synthesized and/or compiled into configuration data for a programmable integrated circuit. At step 104, a set of configuration data may be similarly prepared for a generator of a check code.

At step 106, the sets of configuration data prepared at steps 102 and 104 may be combined, and this set of combined configuration data is stored in a non-volatile memory at step 108. In one example, the configuration data for the user design and the authorization module is stored in the non-volatile memory at a primary boot location and the configuration data for the check code generator is stored in the non-volatile memory at a secondary boot location.

At step 110, a reset of the programmable integrated circuit may cause the programmable integrated circuit to load configuration data from the non-volatile memory. In one embodiment, the configuration data is loaded from the primary boot location because this is the first reset after power-up of the programmable integrated circuit. Thus, the programmable integrated circuit is configured with the configuration data for the user design and the authorization module. After configuration, the programmable integrated circuit implements at least the user design and the authorization module.

At decision 112, the authorization module checks whether the check code is available in the non-volatile memory. For a first reset of the programmable integrated circuit, the check code may not be available from the non-volatile memory and process 100 proceeds to step 114.

At step 114, the authorization module reboots the programmable integrated circuit to reload configuration data from the non-volatile memory. In one embodiment, the configuration data is loaded from the secondary boot location because this is a subsequent reset after power-up of the programmable integrated circuit. Thus, the programmable integrated circuit is configured with the configuration data for the generator of the check code. After configuration, the programmable integrated circuit implements the generator of the check code.

At step 118, the generator erases the configuration data for the generator from the non-volatile memory. This erasure does not affect the generator already implemented in the programmable integrated circuit; however, this erasure prevents reloading the configuration data to again implement the generator in the programmable integrated circuit.

At step 120, the generator reads an identification code of the programmable integrated circuit. In one embodiment, during manufacture each programmable integrated circuit of a particular type is given an identifier that is unique among all programmable integrated circuits of this particular type. For example, the programmable integrated circuits may be fabricated with a set of fuses or anti-fuses, and some are irreversibly blown to manufacture each programmable integrated circuit with an assigned identifier. Each type of programmable integrated circuit is frequently also manufactured with another identifier of the particular type of integrated circuit. For example, the programmable integrated circuits are often fabricated with an identification code and revision number identifying the type of the integrated circuit in a JTAG IEEE 1149.1 TAP. The non-volatile memory is frequently manufactured with additional identifiers, such as a vendor supplied serial number that is stored in the non-volatile memory and an identification code and revision number identifying the type of the non-volatile memory. In one embodiment, these various identifiers are combined to form a system identifier of the combination of the programmable integrated circuit and the non-volatile memory.

At step 122, the generator generates the check code from an identifier of the programmable integrated circuit and/or the non-volatile memory. In one embodiment, the check code is a user-defined cryptographic hash of the combined identifier including, for instance, the identification code and revision number of the type of the programmable integrated circuit, the assigned identifier of the programmable integrated circuit, the identification code and revision number of the type of the non-volatile memory, and the serial number of the non-volatile memory. A cryptographic hash may not be very secure when encrypting a small amount of data. Combining multiple identifiers, however, increases the security of a cryptographic hash even when the identifier of the programmable integrated circuit does not include enough data to ensure cryptographic security.

At step 124, the generator stores the check code in the non-volatile memory. In one embodiment, a region of the non-volatile memory is allocated for storing the check code. The generator may also write the check code to a pseudo-random location within the region, and the generator may also write spurious pseudo-random data to spurious pseudo-random locations in the non-volatile memory. This may increase security because an observer of the writes to the non-volatile memory would have difficulty determining which write writes the check code because of the masking spurious writes.

At step 126, the programmable integrated circuit is ready for normal operation. In one embodiment, a LED gives a visible indication that the check code is available from the non-volatile memory. A power-down of the programmable integrated circuit clears the generator from the programmable integrated circuit, such that the programmable integrated circuit no longer implements the generator. In one embodiment, manufacturing of the system including the programmable integrated circuit optionally continues with process 100 returning to step 110 for a manufacturing test of the programmable integrated circuit. In another embodiment, manufacturing of the system is complete and process 100 returns to step 110 after an end user acquires the system.

Upon returning to step 110, a power-up reset of the programmable integrated circuit causes the programmable integrated circuit to load configuration data from the non-volatile memory. In one embodiment, the programmable integrated circuit is configured to implement the user design and the authorization module with configuration data from the primary boot location in the non-volatile memory. Decision 112 again checks whether the check code is available from the non-volatile memory. Because the check code is now available from the non-volatile memory, process 100 proceeds to step 116.

At step 116, the authorization module reads the check code from the non-volatile memory. In one embodiment, the authorization module may read data values from pseudo-random addresses within the region allocated for storing the check code, with one of the pseudo-random addresses being the pseudo-random location of the check code. This increases security because an observer of the reads from the non-volatile memory would have difficulty determining the read that reads the check code because the other masking reads to spurious locations.

At step 128, the authorization module reads the identifiers of the programmable integrated circuit and/or the non-volatile memory. In one embodiment, the authorization module reads and combines the identifiers into a system identifier in a manner similar to step 120.

At step 130, the authorization module generates an activation code from the identifiers of the programmable integrated circuit and/or the non-volatile memory. The activation code is generated in a manner similar to the generation of the check code at step 122. In one embodiment, the activation code is the user-defined cryptographic hash of the system identifier including the identification code and revision number of the type of the programmable integrated circuit, the assigned identifier of the programmable integrated circuit, the identification code and revision number of the type of the non-volatile memory, and the serial number of the non-volatile memory.

Decision 132 checks whether the activation code matches the check code. For matching activation and check codes, process 100 proceeds to step 134. At step 134, the authorization module enables operation of the user design implemented in the programmable integrated circuit.

If the activation and check codes do not match, process 100 proceeds to step 136. If an unauthorized user copies the configuration data and the check code from a first to a second programmable integrated circuit, the copied configuration data often successfully implements the authorization module in the second programmable integrated circuit. However, because the identifiers differ between the two programmable integrated circuits, the second programmable integrated circuit generates an authorization code that does not match the check code. Thus, the authorization module can disable the implementation of the user design in the second programmable integrated circuit. In one embodiment, the authorization module completely disables the user design. In another embodiment, the authorization module enables only a limited portion of the user design. Other types of security or disabling/crippling behavior, such as physical destruction or generating a report, are also possible and can be triggered by the authorization module.

Figure 2:
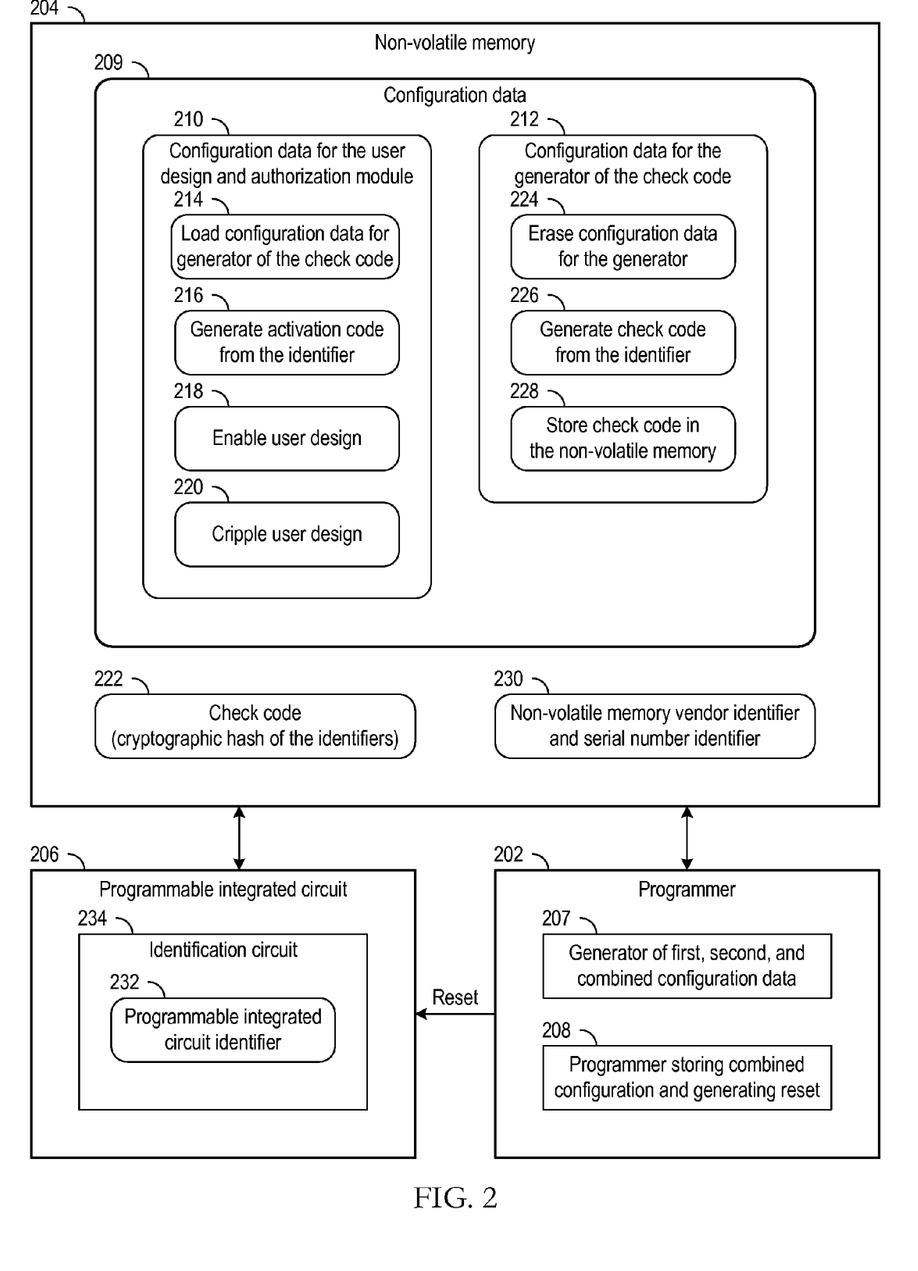
FIG. 2 is a block diagram of a system for implementing a user design and enabling authorized use of the user design in accordance with various embodiments of the invention.

FIG. 2 is a block diagram of a system for implementing a user design and enabling authorized use of the user design in accordance with various embodiments of the invention. A programmer 202 programs a non-volatile memory 204 to configure a programmable integrated circuit 206 to implement and authorize a user design.

The programmer 202 includes a generator 207 of configuration data. The generator 207 generates a set of configuration data for an authorization module and a user design, and an additional set of configuration data for a generator of a check code. The programmer 202 also includes a programmer 208 storing the set of combined configuration data 209 in the non-volatile memory 204 and generating an initial reset of the programmable integrated circuit 206.

The combined configuration data 209 includes configuration data 210 for implementing the user design and the authorization module in the programmable integrated circuit 206, and configuration data 212 for implementing the generator of a check code in the programmable integrated circuit 206. The configuration data 210 is stored in the non-volatile memory 204 at a primary boot location. The initial reset from the programmer 202 causes the programmable integrated circuit 206 to implement the authorization module and the user design after loading the configuration data 210 from the primary boot location. The configuration data 210 includes modules 214, 216, 218, and 220 of the authorization module.

Module 214 of the authorization module conditionally configures programmable integrated circuit 206 to load configuration data 212 into the programmable integrated circuit 206. In one embodiment, module 214 implemented in the programmable integrated circuit 206 loads load configuration data 212 when the check code 222 is not available from the non-volatile memory 204. In one example, the location of the check code 222 has a default value, such as a value of zero, when the check code 222 has not yet been stored in the non-volatile memory 204, and this default value indicates that the check code 222 is not available from the non-volatile memory 204. The default value of the location of check code 222 is the manufactured value of the location, and/or an initialization value given to the location by the programmer 202 during the programming of the non-volatile memory 204 with the combined configuration data 209.

In one embodiment, module 214 implemented in the programmable integrated circuit 206 generates an internal reset of the programmable integrated circuit 206 when the check code 222 is not available from the non-volatile memory 204. The internal reset causes the programmable integrated circuit 206 to load configuration data 212 located at a secondary boot location in the non-volatile memory 204.

After the programmable integrated circuit 206 is configured with configuration data 212 because the check code 222 is not yet available from the non-volatile memory 204, the programmable integrated circuit 206 implements the generator of the check code 222. The configuration data 212 includes modules 224, 226, and 228 of the generator of the check code 222. Module 224 implemented in the programmable integrated circuit 206 erases the configuration data 212 from the combined configuration data 209 in the non-volatile memory 204. Module 226 implemented in the programmable integrated circuit 206 generates a check code from an identifier, and module 228 implemented in the programmable integrated circuit 206 stores the check code 222 in the non-volatile memory 204.

In one embodiment, module 226 implemented in the programmable integrated circuit 206 generates the check code 222 from an identifier 230 of the non-volatile memory 204 and an identifier 232 from an identification circuit 234 of the programmable integrated circuit 206. The identifier 230 of the non-volatile memory 204 is may be stored in the non-volatile memory 204 by a manufacturer or vendor of the non-volatile memory 204. The identifier 230 may be a serial number within a type of the non-volatile memory 204 and an identifier of the type of the non-volatile memory 204. The identifier 232 of the programmable integrated circuit 206 may be a distinct identifier among the identifiers of integrated circuits having the type of programmable integrated circuit 206. The identifier 232 may also include an identifier intended to identify uniquely the type of programmable integrated circuit 206. In one embodiment, the generated and stored check code 222 is a user-defined function of the identifiers 230 and 232, such as a cryptographic hash of these identifiers 230 and 232.

In one embodiment, the programmable integrated circuit 206 is again reset, for example by cycling the power supplied to the programmable integrated circuit 206. This reset again causes the configuration data 210 to be loaded into the programmable integrated circuit 206. Module 214 implemented in the programmable integrated circuit 206 again checks whether the check code 222 is available from the non-volatile memory 204. Because the check code 222 is available now, module 216 implemented in the programmable integrated circuit 206 generates an activation code to compare with the check code 222. In one embodiment, the activation code is generated from identifiers 230 and 232 in a manner similar to the generation of the check code 222.

Module 218 implemented in the programmable integrated circuit 206 enables the user design implemented in the programmable integrated circuit 206 when the activation code matches the check code 222. In one embodiment, module 220 implemented in the programmable integrated circuit 206 cripples the user design implemented in the programmable integrated circuit 206 when the activation code does not match the check code 222.

In one embodiment, programmer 202 may generate configuration data 210 for implementing the user design and an authorization module in the programmable integrated circuit 206. Programmer 202 may generate configuration data 212 including modules 224, 226, and 228, with module 224 for implementing an erasure module in the programmable integrated circuit 206 and modules 226 and 228 for implementing a generator in the programmable integrated circuit 206. Programmer 202 may combine the configuration data 210 and 212 into a combined configuration data 209. Programmer 202 may store the combined configuration data 209 in the non-volatile memory 204 for the programmable integrated circuit 206.

In this embodiment, the programmable integrated circuit 206 may implement the erasure module 224 and the generator modules 226 and 228 in response to the check code 222 not yet being available from the non-volatile memory 204. The programmable integrated circuit 206 implementing the erasure module 224 may erase the configuration data 212 from the combined configuration 209 data stored in the non-volatile memory 204. The programmable integrated circuit 206 implementing the generator modules 226 and 228 may generate the check code 222 from an identifier 232 of the programmable integrated circuit 206, and may store the check code 222 in the non-volatile memory 204.

Figure 3:
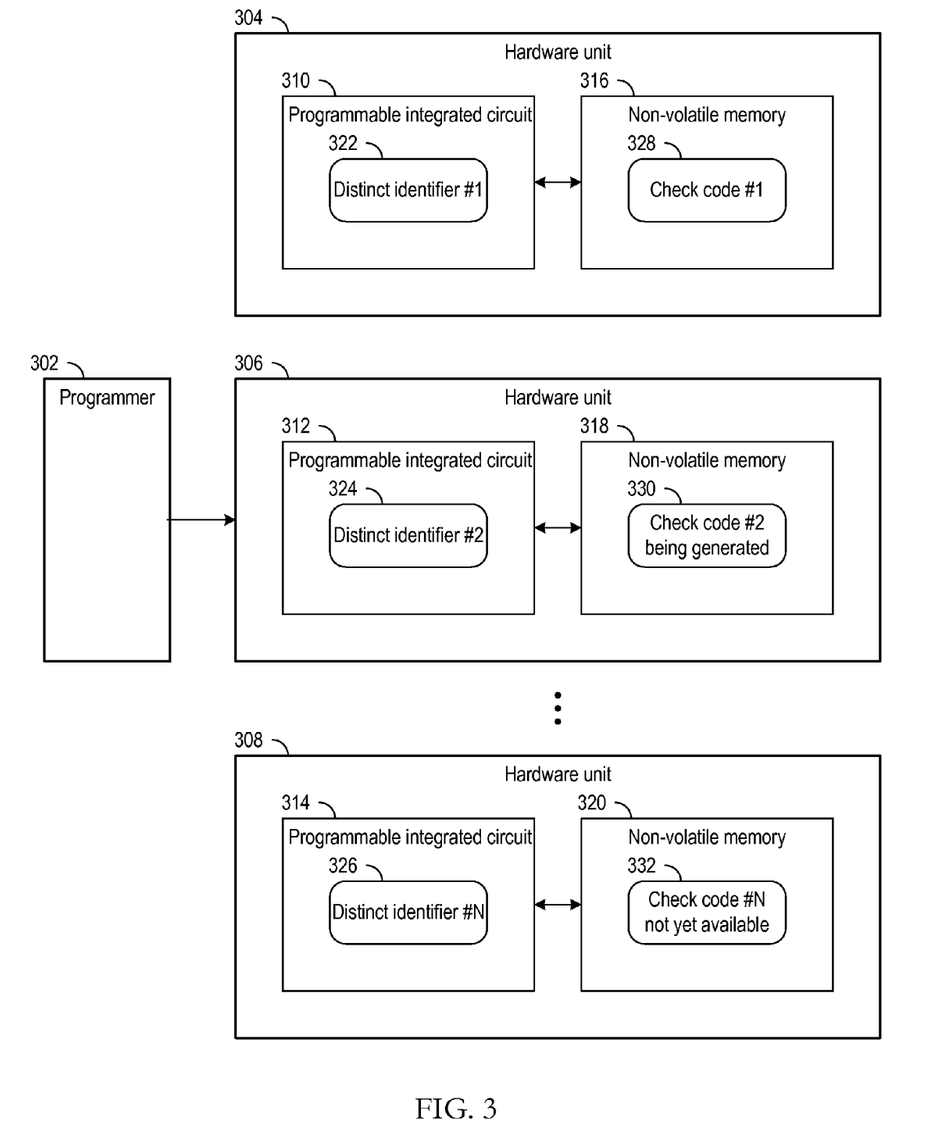
FIG. 3 is a block diagram of a production line for implementing a user design in accordance with one or more embodiments of the invention.

FIG. 3 is a block diagram of a production line for implementing a user design in accordance with one or more embodiments of the invention. A programmer 302 successively programs hardware units 304, 306, and 308. As shown, programmer 302 has already programmed hardware unit 304, is currently programming hardware unit 306, and next programs hardware unit 308.

Hardware units 304, 306, and 308 respectively include programmable integrated circuits 310, 312, and 314 of a particular type, and respectively include non-volatile memories 316, 318, and 320. Programmable integrated circuits 310, 312, and 314 respectively have identifiers 322, 324, and 326 that are distinct from each other and unique among similar identifiers of all integrated circuits matching the particular type of programmable integrated circuits 310, 312, and 314.

Programmer 302 has already caused non-volatile memory 316 to be programmed with a check code 328 generated from the distinct identifier 322. Thus, check code 328 is available from non-volatile memory 316.

Programmer 302 is currently programming hardware unit 306. In one embodiment, programmer 302 programs non-volatile memory 318 with configuration data for a generator and with configuration for an authorization module and a user design. Programmer 302 then generates a power-up reset of programmable integrated circuit 312. In response to the reset, programmable integrated circuit 312 loads the configuration data for the authorization module and the user design from a primary boot location in the non-volatile memory 318. The authorization module implemented in the programmable integrated circuit 312 checks whether the check code 330 is available from the non-volatile memory 318. Because the check code 330 is not yet available, the authorization module implemented in the programmable integrated circuit 312 generates an internal reset of the programmable integrated circuit 312. In response to this second reset since power-up, programmable integrated circuit 312 loads the configuration data for the generator from a secondary boot location in the non-volatile memory 318. The generator implemented in the programmable integrated circuit 312 generates and stores the check code 330 in the non-volatile memory 318. The generator implemented in the programmable integrated circuit 312 generates the check code 330 from the distinct identifier 324 of the programmable integrated circuit 312. Because identifiers 322 and 324 differ for programmable integrated circuits 310 and 312, the check code 330 generally differs from the check code 328.

In one embodiment, the programmer 302 generates another power-up reset of the programmable integrated circuit. In response to the reset, programmable integrated circuit 312 again loads the configuration data for the authorization module and the user design from a primary boot location in the non-volatile memory 318. Because the authorization module implemented in the programmable integrated circuit 312 finds that the check code 330 is available and matches a generated activation code, the authorization module implemented in the programmable integrated circuit 312 enables the user design implemented in the programmable integrated circuit 312. If the activation code does not match the check code 330, then the authorization module implemented in the programmable integrated circuit 312 disables the user design implemented in the programmable integrated circuit 312.

In one embodiment, programmer 302 may store configuration data in the respective non-volatile memories 316, 318, and 320 for the programmable integrated circuits 310, 312, and 314.

Figure 4:
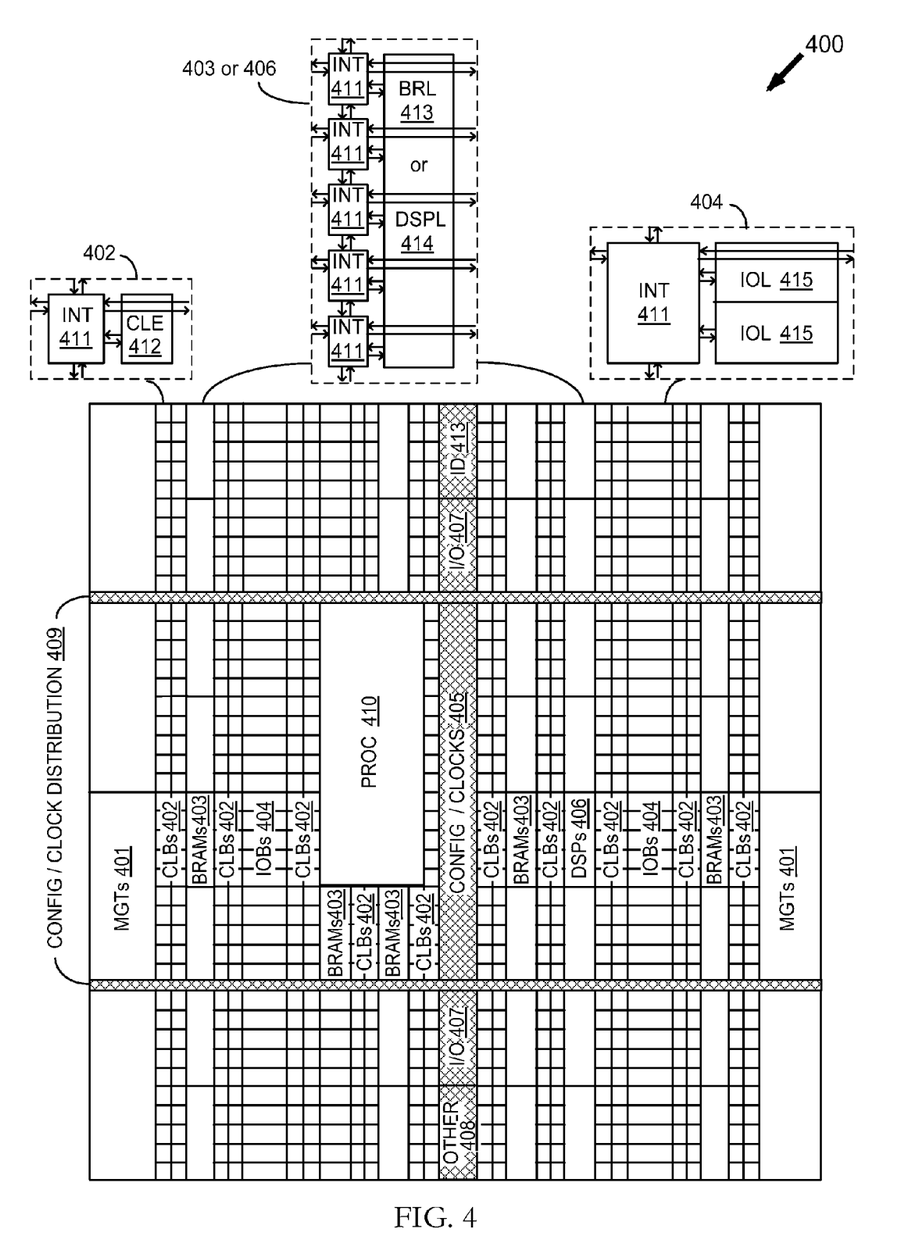
FIG. 4 is a block diagram of the architecture of a programmable integrated circuit that can implement and authorize a user design in accordance with various embodiments of the invention.

FIG. 4 is a block diagram of the architecture 400 of a programmable integrated circuit that can implement and authorize a user design in accordance with various embodiments of the invention.

One type of programmable integrated circuit is a field programmable gate array (FPGA). An advanced FPGA can include several different types of programmable logic blocks in the array. For example, FIG. 4 illustrates an FPGA architecture 400 that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407) (e.g., configuration ports and clock ports), an identifier 413 of the FPGA and other programmable logic 408 such as digital clock managers, analog-to-digital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element (INT 411) also includes the connections to and from the programmable logic element within the same tile, as shown by the examples included at the top of FIG. 4.

For example, a CLB 402 can include a configurable logic element (CLE 412) that can be programmed to implement user logic plus a single programmable interconnect element (INT 411). A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element (INT 411). As will be clear to those of skill in the art, the actual I/O pads connected, for example, to the I/O logic element 415 typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

During manufacture of a hardware unit including the FPGA, the FPGA is configured with configuration data that implements a generator in the array of programmable logic blocks. The generator generates the check code and erases itself from the configuration data. The generator generates the check code from the identifier 413 of the FPGA. Subsequently, the FPGA is configured with the configuration data that implements an authorization module and a user design in the array of programmable logic blocks. The authorization module verifies the check code and enables the user design. If the check code and configuration data with the generator erased are copied to a second FPGA of the same type, the authorization module instead determines that the check code is invalid because the second FPGA has a different value of the identifier 413. For an invalid check code, the authorization module disables or cripples the user design implemented in the FPGA.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

The present invention is thought to be applicable to a variety of systems for implementing a user design and enabling authorized use of the user design. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A system for implementing a user design and enabling authorized use of the user design, comprising:
 a non-volatile memory storing a combined configuration data set that includes first and second configuration data sets, the first configuration data set for implementing a user design and an authorization module in a programmable integrated circuit, and the second configuration data set for implementing a generator of a check code in a programmable integrated circuit; and
 a programmable integrated circuit coupled to the non-volatile memory, the programmable integrated circuit loading the first configuration data set from the non-volatile memory in response to a reset of the programmable integrated circuit, the programmable integrated circuit implementing the user design and the authorization module in response to the loading of the first configuration data set, the implemented authorization module generating an activation code from an identifier in response to the check code being available from the non-volatile memory and enabling the user design in response to the check code being available and matching the activation code, the programmable integrated circuit loading the second configuration data set from the non-volatile memory and implementing the generator in response to the check code not being available from the non-volatile memory, the implemented generator erasing the second configuration data set from the non-volatile memory, generating the check code from the identifier, and storing the check code in the non-volatile memory.

2. The system of claim 1, wherein the identifier is an identifier of the programmable integrated circuit assigned by a vendor of the programmable integrated circuit.

3. The system of claim 1, wherein the identifier is an identifier of the non-volatile memory that includes a serial number of the non-volatile memory and an identifier of a vendor of the non-volatile memory.

4. The system of claim 1, wherein the implemented authorization module generates another reset of the programmable integrated circuit in response to the check code not being available from the non-volatile memory, and
 the programmable integrated circuit loads the second configuration data set from the non-volatile memory in response to the another reset of the programmable integrated circuit.

5. The system of claim 1, wherein the implemented authorization module disables the user design in response to the check code being available and not matching the activation code.

6. The system of claim 1, wherein the implemented authorization module enables a limited portion of the user design in response to the check code being available and not matching the activation code.

7. The system of claim 1, wherein the identifier is a system identifier that includes an identifier of the programmable integrated circuit and an identifier of the non-volatile memory,
 the programmable integrated circuit includes an identification circuit providing the identifier of the programmable integrated circuit, and the non-volatile memory stores the identifier of the non-volatile memory.

8. The system of claim 7, wherein the identifier of the programmable integrated circuit is assigned by a vendor of the programmable integrated circuit and is unique among all integrated circuits matching a type of the programmable integrated circuit, and the identifier of the non-volatile memory is an identifier of a vendor of the non-volatile memory together with a serial number identifier assigned by the vendor of the non-volatile memory.

9. The system of claim 7, wherein the implemented authorization module generates the activation code that is a cryptographic hash of the system identifier, and the implemented generator generates the check code that is the cryptographic hash of the system identifier.

10. The system of claim 7, wherein the implemented authorization module generates the activation code that is a user selectable function of the system identifier, and the implemented generator generates the check code that is the user selectable function of the system identifier.

11. The system of claim 1, wherein the check code is stored in a pseudo-random location in the non-volatile memory.

12. The system of claim 11, wherein the implemented authorization module reads the check code from the pseudo-random location in the non-volatile memory, and reads data from spurious locations in the non-volatile memory for masking the check code.

13. The system of claim 11, wherein the implemented generator stores the check code in the pseudo-random location in the non-volatile memory, and stores spurious data to spurious locations in the non-volatile memory for masking the check code.

14. The system of claim 1, wherein the implemented generator provides a visible indication that the check code is available from the non-volatile memory following the storing of the check code in the non-volatile memory.

15. The system of claim 1, further comprising a programmer coupled to the non-volatile memory and the programmable integrated circuit, wherein the programmer generates the first and second configuration data sets, combines the first and second configuration data sets into the combined configuration data set, stores the combined configuration data set in the non-volatile memory, and generates the reset of the programmable integrated circuit.

16. The system of claim 1, wherein the system is a production line for building a series of hardware units, one of the hardware units including the non-volatile memory and the programmable integrated circuit, each of the hardware units including a corresponding non-volatile memory coupled to a corresponding programmable integrated circuit, the system correspondingly authorizing an implementation of the user design in each of the hardware units using the identifier that is distinct for each of the hardware units.

17. A method to authorize an implementation of a user design in each of at least one programmable integrated circuit, comprising:

generating a first configuration data set for implementing the user design and an authorization module in the programmable integrated circuit;

generating a second configuration data set for implementing an erasure module and a generator of a check code in the programmable integrated circuit;

combining the first and second configuration data sets into a combined configuration data set;

storing the combined configuration data set in a respective non-volatile memory for the programmable integrated circuit;

implementing the erasure module and the generator in the programmable integrated circuit using the combined configuration data set from the respective non-volatile memory in response to the check code not being available from the respective non-volatile memory, wherein the erasure module erases the second configuration data set from the combined configuration data set stored in the respective non-volatile memory, and the generator generates the check code from an identifier of the programmable integrated circuit and stores the check code in the respective non-volatile memory; and implementing the user design and the authorization module in the programmable integrated circuit using the combined configuration data set from the respective non-volatile memory, wherein the authorization module generates an activation code from the identifier of the programmable integrated circuit in response to the check code being available from the respective non-volatile memory and enables the user design in response the check code being available and matching the activation code.

18. The method of claim 1, wherein the authorization module disables the user design in response to the check code being available and not matching the activation code.

19. The method of claim 1, wherein the at least one programmable integrated circuit is a plurality of programmable integrated circuits, each of the plurality of programmable integrated circuits has the identifier that is a distinct identifier of the programmable integrated circuit, and the storing step and the implementing steps are performed for each of the plurality of programmable integrated circuits.

20. A system to authorize an implementation of a user design in each of at least one programmable integrated circuit, comprising:

means for generating a first configuration data set for implementing the user design and an authorization module in the programmable integrated circuit;

means for generating a second configuration data set for implementing an erasure module and a generator of a check code in the programmable integrated circuit;

means for combining the first and second configuration data set into a combined configuration data set;

means for storing the combined configuration data set in a respective non-volatile memory for the programmable integrated circuit;

means for implementing the erasure module and the generator in the programmable integrated circuit using the combined configuration data set from the respective non-volatile memory in response to the check code not being available from the respective non-volatile memory, including means for erasing the second configuration data set from the combined configuration data set stored in the respective non-volatile memory, means for generating the check code from an identifier of the programmable integrated circuit, and means for storing the check code in the respective non-volatile memory; and means for implementing the user design and the authorization module in the programmable integrated circuit using the combined configuration data set from the respective non-volatile memory, including means for generating an activation code from the identifier of the programmable integrated circuit in response to the check code being available from the respective non-volatile memory, and means for enabling the user design in response the check code being available and matching the activation code.

* * * * *